United States Patent [19]

Bandyopadhyay et al.

[11] Patent Number: 4,708,838

[45] Date of Patent: * Nov. 24, 1987

[54] METHOD FOR FABRICATING LARGE CROSS SECTION INJECTION MOLDED CERAMIC SHAPES

[75] Inventors: Gautam Bandyopadhyay, Acton, Mass.; Kenneth W. French, Merrimack, N.H.; Leslie J. Bowen, Concord; Jeffrey T. Neil, E. Pepperell, both of Mass.

[73] Assignee: GTE Laboratories Incorporated, Waltham, Mass.

[ * ] Notice: The portion of the term of this patent subsequent to Nov. 3, 2004 has been disclaimed.

[21] Appl. No.: 716,274

[22] Filed: Mar. 26, 1985

[51] Int. Cl.$^4$ .............................................. C04B 35/64
[52] U.S. Cl. ..................................... 264/63; 264/62; 264/328.2; 264/344
[58] Field of Search ................. 264/62, 63, 328.2, 344

[56] References Cited

U.S. PATENT DOCUMENTS

| | | | |
|---|---|---|---|
| 2,939,199 | 6/1960 | Strivens | 264/63 |
| 3,234,308 | 2/1966 | Herrmann | 264/63 |
| 3,238,048 | 1/1966 | Somers | 264/63 |
| 3,882,210 | 5/1975 | Crossley et al. | 264/63 |
| 4,144,207 | 3/1979 | Ohnsorg | 264/56 |
| 4,248,813 | 2/1981 | Hattori et al. | 264/62 |
| 4,283,360 | 8/1981 | Henmi et al. | 264/63 |
| 4,460,527 | 7/1984 | Kato | 264/63 |
| 4,550,004 | 10/1985 | Mizuno | 264/66 |

FOREIGN PATENT DOCUMENTS

| | | | |
|---|---|---|---|
| 58-95640 | 6/1983 | Japan | 501/97 |
| 59-120406 | 7/1984 | Japan . | |

OTHER PUBLICATIONS

Whalen et al, Progress on Injection-Molded Reaction-Bonded SiC, Ceramics for High Performance Applications–II, 5th Army Mat'l Tech. Conf., Mar. 1977, pp. 179–189.

Mangels, Development of Injection Molded Reaction Bonded $Si_3N_4$, Ceramics for High Performance Applications–II, 5th Army Mat'l Tech. Conf., Mar. 1977, pp. 113–130.

Schnittgrund, Injection Molded Ceramic Rocket Engine Components, SAMPE, Quarterly, Jul. 1981, pp. 8–13.

Quackenbush et al, Fabrication of Sinterable Silicon Nitride by Injection Molding, 19th Summary Report-Auto. Tech. Devel. Contractors' Coordination Meeting, Oct. 1981, pp. 424–437.

Bandyopadhyay et al, Injection Molded Silicon Nitride for Engine Applications: Fab. and Prop, 21st Auto, Tech., Devel. Contractors Coor. Meeting, Mar. 1984, pp. 315–320.

European Patent Application No. EP 0 032 403.

*Primary Examiner*—James Derrington
*Attorney, Agent, or Firm*—Ivan L. Ericson

[57] ABSTRACT

A method for fabricating large, greater than one centimeter cross section, high density silicon nitride by injection molding process has been developed. The method requires use of a controlled starting powder, a novel binder removal process, a prefiring step followed by isopressing and conventional sintering.

30 Claims, No Drawings

METHOD FOR FABRICATING LARGE CROSS SECTION INJECTION MOLDED CERAMIC SHAPES

The Government has rights in this invention pursuant to Contract No. DEN 3-168 awarded by NASA/DOE.

CROSS REFERENCE TO RELATED APPLICATION

A co-pending patent application, Ser. No. 716,080, filed concurrently herewith, entitled METHOD FOR INJECTION MOLDING AND REMOVING BINDER FROM LARGE CROSS SECTION CERAMIC SHAPES by Bandyopadhyay et al., and assigned to GTE Laboratories Incorporated, assignee of the present application, concerns related subject matter of this application.

FIELD OF THE INVENTION

This invention relates to a method for injection molding of ceramics. More particularly it relates to a method of injection molding high density silicon nitride articles having large cross sections.

BACKGROUND

Injection molding of ceramics has been described by several authors in the open literature (e.g. T. J. Whalen et al., Ceramics for High Performance Application-II, Ed. J. J. Burke, E. N. Lenoe, and R. N. Katz, Brook Hill Publishing Co. 1978, pp. 179-189, J. A. Mangels, Ceramics for High Performance Application-II, pp. 113-129, G. D. Schnittgrund, SAMPE Quarterly, p. 8-12, July 1981, etc.) and in patent literature (e.g. M. A. Strivens, U.S. Pat. No. 2939199, 1960, I. A. Crossley et al., U.S. Pat. No. 3882210, 1975, R. W. Ohnsorg, U.S. Pat. No. 4144207, 1979, etc.). Several papers have also been published by GTE authors (e.g. C. L. Quackenbush et al., Contractors Coordination Meeting Proceedings, 1981, G. Bandyopadhyay et al., Contractors Coordination Meeting Proceedings, 1983). The general process routing for injection molding is well known. It includes (a) compounding which involves mixing the high surface area ceramic with molten organic binder, (b) injection molding by which the powder/binder mix is formed into a given shape in a metallic mold, (c) binder removal which must be accomplished without disrupting the ceramic structure, and (d) consolidation of the part by sintering and/or by hot isostatic pressing. Significant effort has been made by various researchers to determine the effects of starting powder particle size and size distribution on moldability of powder, and to identify binder systems that allow easy compounding, molding and binder burnout (without disruption) from the part. Although volumes of patent literature now exist on powder requirements, different binder concepts and binder removal processes, it is generally recognized that injection molding and binder removal from a large, complex cross section part (e.g. rotors for turbine engines) poses a very difficult task because of internal and external cracking during burnout. An extensive evaluation of the patent literature reveals that in most cases only small cross section (less than 1.00 cm) parts were considered as examples, or that the cross sections and complexities were not revealed. None of these references described fabrication of large, complex cross section silicon nitride parts, specifically fabricated by injection molding and sintering. GTE Laboratories has developed a process routing which is highly successful for fabrication of good quality small cross section injection molded and sintered parts, such as turbine blades and vanes, in large quantities. Since this development, improvements in binder composition (K. French et al., U.S. Pat. No. 4,456,713) allowed further simplification of molding and binder removal procedures. This process routing however, failed to produce an externally crack-free injection molded ceramic article having a large cross section one centimeter or greater (e.g, turbine rotor and turbocharger sized test parts). It has been established that the use of a submicron starting powder, such as silicon nitride containing $Y_2O_3$ and $Al_2O_3$, and a binder results in certain fundamental difficulties which causes external and internal cracking in large cross section parts.

OBJECTS OF THE INVENTION

Accordingly, it is an object of the present invention to provide a new and improved method of injection molding, binder removal and densifying a ceramic article having a large cross section which is crack-free. A process routing capable of making large, complex cross section parts can always be used for fabrication of small parts. The reverse may not always be true.

SUMMARY OF THE INVENTION

This and other objects, advantages, and capabilities are provided in accordance with one aspect of the present invention wherein there is provided a method for fabricating a large cross-sectional ceramic article by injection molding comprising the following steps:

Step 1. A ceramic powder having a mean particle size from about 2 to about 12 microns is compounded with about 34 to about 42 v/o of a binder.

Step 2. The product from step 1 is injection molded to form a molded ceramic article having a cross section greater than one centimeter.

Step 3. The product from step 2 is embedded in a setter bed containing a setter powder.

Step 4. A binder retarding layer of the setter powder is formed on the molded ceramic article by heating the product of step 3 in a non-oxidizing environment at a heating rate equal to or greater than 1° C. per hour to 450° C. The setter powder retards the removal of the binder from the molded ceramic article sufficiently to maintain equal to or greater than 80 w/o of the binder within the molded ceramic article until 400° C. is obtained.

Step 5. Between 400° and 450° C. the binder is removed primarily by vaporization from the part surface by increasing the temperature from step 4 to 450° C. at a rate equal to or greater than 1° C. per hour in a non-oxidizing environment.

Step 6. The heating of the product of step 5 is increased to 600° C. and the product is maintained at that temperature in air for a period sufficient to completely remove the binder from the molded ceramic article.

Step 7. The product from step 6 is cooled to room temperature to obtain an externally crack-free injection molded and binder free ceramic article having a cross section greater than one centimeter.

Step 8. The product from step 7 is isopressed at a pressure equal to or greater than 5,000 psi.

Step 9. The product from step 8 is sintered at a temperature sufficient to obtain a density greater than 98% of theoretical density.

Another aspect of the present invention wherein another method is provided for fabricating a large cross-sectional ceramic article by injection molding comprising the following steps:

Step 1. A ceramic powder having a mean particle size from about 2 to about 12 microns is compounded with about 34 to about 42 v/o of a binder.

Step 2. The product from step 1 is injection molded to form a molded ceramic article having a cross section greater than one centimeter.

Step 3. The product from step 2 is embedded in a setter bed containing a setter powder.

Step 4. A binder retarding layer of the setter powder is formed on the molded ceramic article by heating the product of step 3 in a non-oxidizing environment at a heating rate equal to or greater than 1° C. per hour to 450° C. The setter powder retards the removal of the binder from the molded ceramic article sufficiently to maintain equal to or greater than 80 w/o of the binder within the molded ceramic article until 400° C. is obtained.

Step 5. Between 400° and 450° C. the binder is removed primarily by vaporization from the part surface by increasing the temperature from step 4 to 450° C. at a rate equal to or greater than 1° C. per hour in a non-oxidizing environment.

Step 6. The heating of the product of step 5 is increased to 600° C. and the product is maintained at that temperature in air for a period sufficient to completely remove the binder from the molded ceramic article.

Step 7. The product from step 6 is cooled to room temperature to obtain an externally crack-free injection molded and binder free ceramic article having a cross section greater than one centimeter.

Step 8. The product from 7 is heated to a temperature less than or equal to about 1500° C. in nitrogen atmosphere.

Step 9. The product from step 8 is isopressed at a pressure equal to or greater than 5,000 psi.

Step 10. The product from step 9 is sintered at a temperature sufficient to obtain a density greater than 98% of theoretical density.

DETAILED DESCRIPTION OF THE INVENTION

It has been established that the use of a submicron starting powder (such as processed silicon nitride containing $Y_2O_3$ and $Al_2O_3$) and a wax based binder (both of which are used for small cross section parts) resulted in certain fundamental difficulties which caused external and internal cracking in large cross section parts. The cracking problem increases with increasing part size and part complexity. The fundamental difficulties arise due to migration of liquid binder driven by capillary action from the interior of the part to its surface. The liquid binder often carries fine submicron silicon nitride particles from the bulk to the surface causing a density gradient, shrinkage gradient and cracking. In addition to fine particle migration, the capillary forces exert an outward drag on all particles causing them to start compaction at the part surface. As a result, the surface becomes rigid and prevents part shrinkage. Thus as the binder loss continues, the interior shrinks away from the rigid surface region causing the formation of cracks. This understanding of binder loss and cracking mechanisms is the basis for the present invention. The concepts pursued in this invention are as follows:

Reduce the amount of fine particles (less than one micron silicon nitride particles) or eliminate fine particles from the starting powder to reduce or eliminate their preferential migration to the surface.

Increase the particle size of the starting powder to reduce the capillary forces which, in turn, reduce the outward particle drag.

Develop a burnout setter powder composition and a thermal cycle, which allows liquid migration at the highest possible temperatures so that the liquid viscosity is at its lowest level when removed from the part.

Optimize powder morphology, powder volume loading, compounding, molding, and burnout to fabricate externally crack-free burned out large cross section part. The part at this stage may contain internal defects.

Eliminate internal defects by applying compressive stresses on a partially or a fully burned out or a prefired part. This can be achieved by isopressing using a flexible bag such as rubber or a conformal coating. An alternative process would be to use clad hot isostatic pressing.

Conventional sintering of cold isopressed parts.

This invention for the first time, provides a complete process routing for fabrication of a large cross section injection molded silicon nitride part which is crack free.

Table I shows the detailed process routing which has successfully produced crack free, internal as well as external, turbocharger sized test parts having cross sectional dimension up to 1.9 cm. Since, at the present time, silicon nitride powder is not available in the desired particle sizes, conventionally processed powder $Si_3N_4+6$ w/o $Y_2O_3+2$ w/o $Al_2O_3$, designated here as AY6, was calcined and remilled to obtain the desired mean particle size.

TABLE I

Injection Molding Process Routing For A Large Cross-Section Part.

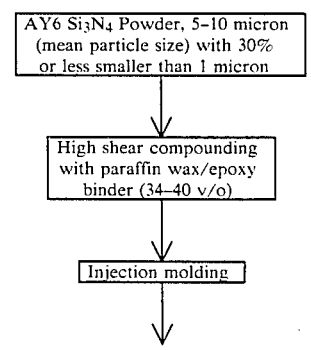

TABLE I-continued

Injection Molding Process Routing For A Large Cross-Section Part.

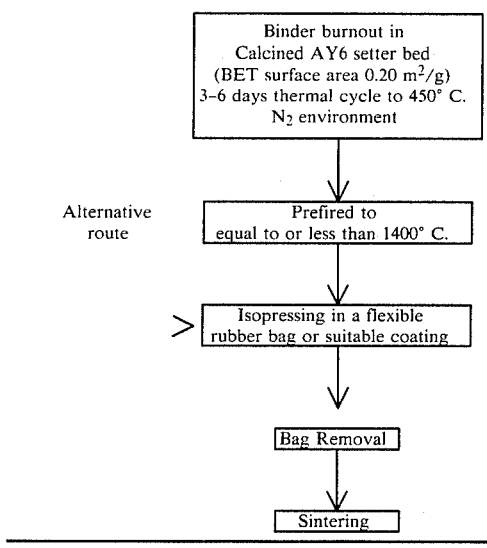

To obtain a ceramic powder such as AY6, having a desired mean particle size of about 2 to about 12 microns, preferably from about 5 to about 10 microns from a conventionally processed ceramic powder having a mean particle size less than one micron, the conventionally processed ceramic powder is calcined followed by comminuting to obtain the desired particle size. In the case of AY6, the calcining temperature was from about 1400° C. to about 1800° C. followed by milling for about 6 to about 36 hours as illustrated in Table II as powder numbers 2, 3 and 4.

Table II summarizes the surface area, mean and median particle size (as measured by x-ray sedigraph) and the weight fraction of less than one micron particles in the powder of the calcined and milled AY6 powders, powder numbers 2, 3 and 4, compared to a control AY6 powder which was not calcined. As Table II indicates, the calcining followed by milling of AY6 powder produces the desired mean particle sizes.

The calcined and milled AY6 ceramic powder is compounded with about 34 v/o to about 42 v/o, preferably from about 37 v/o to about 40 v/o of a wax based binder such as 90 w/o paraffin wax (Astor Chemical 1865Q), 5 w/o of surfactant (Fisher oleic acid A-215), and 5 w/o of epoxy thermosetting material (Acme 5144). The compounding is done in a Bramley two bladed dispersion mixer. The mixing chamber is heated to 80° C. Mixing is continued until the material has a creamy, homogenous appearance.

About 2 hours of mixing time subsequent to the initial blending of the particulate and binder materials is sufficient. At this point a vacuum is applied and the mixing continued approximately 45 minutes to remove any entrapped air. The resulting mixture has rheological properties comparable to a thermoplastic material with a softening range of 40° to 75° C. It can be pelletized or granulated according to well known techniques to a uniform particle size suitable as a feed material for injection molding apparatus.

The molding is accomplished by known injection molding techniques. Injection molding is usually carried out utilizing the transfer method or the direct injection method. In the transfer method a hydraulic press forces the material from a heated storage chamber, by means of a plunger, through sprues or runners, into a mold. In the direct injection method, the heated mixture is forced directly into the mold, through runners and gates, by either a hydraulic plunger or by reciprocating screw equipment. Either method may be utilized. The compounded material was injection molded into turbocharger sized shapes having cross sections up to 1.9 cm utilizing a 30 ton Trubor injection molding machine. Granulated material was loaded into the storage chamber and preheated to the molding temperature. Optimum molding temperature is usually just above the melting point of the binder composition. Where paraffin wax is the major binder component and epoxy is a minor component, the chamber temperature was 70°-72° C. The die was maintained at room temperature (24° C.). Molding pressure must be sufficient to force the preheated mixture into all areas of the die. A pressure of 3,000 to 10,000 psi is adequate for these materials, die and molding conditions. The shot was injected into the die cavity and the pressure held for ½ minute. The pressure was released, the die opened, and the parts removed from the die.

The injection molded green turbocharger sized parts were placed in a tray and embedded in a setter powder of calcined AY6 powder having a surface area (BET) of 0.2 m²/g.

The binder was removed from the molded parts by heating the embedded parts in a non-oxidizing environment such as nitrogen up to a temperature of 450° C. to completely remove the binder. During initial heating at 10° C./hr or greater in which 15 w/o to 20 w/o of the binder was removed the setter powder formed a thick cake around the part. The cake prevented further binder loss until the temperature was sufficiently high, approximately 400° C. up to 450° C., to break down the barrier by the thermal decomposition and vaporization of the binder. Thus, the majority of the binder loss occurred after a temperature of 400° C. was obtained and up to 450° C. The temperature of 450° C. was then raised to 600° C. and the heating was continued at 600° C. for up to 20 hours in air to remove the residual binder or carbon from the part. For turbocharger sized test parts about 3 days of thermal treatment was sufficient to completely remove the binder. For larger than turbocharger sized cross section parts, a substantially lower heating rate, as low as 1° C./hr may be required or a total thermal treatment of approximately 17 days. The part was then cooled to room temperature. The resulting turbocharger sized part was free of external cracks.

Other low surface area powder stable up to 600° C. could behave similar to silicon nitride setter powder and thus may be equally effective for burnout, binder removal, purposes. The use of a calcined and milled powder (as specified in Table II) and a silicon nitride setter powder successfully eliminated external cracks from more than 30 turbocharger sized test parts having cross sections up to 1.9 cm.

TABLE II

INJECTION MOLDING SILICON NITRIDE POWDER CHARACTERISTICS

| Powder Number | Processing Condition | BET ($m^2/g$) | X-ray Sedigraph Particle Mean Size (micron) | X-ray Sedigraph Particle Median Size (micron) | % less than 1 micron |
|---|---|---|---|---|---|
| 1. | Standard Processed AY6* | 11.06 | 1.78 | .88 | 65.0 |
| 2. | Calcined. 1400° C. for 4 h. milling for 6 h | 5.00 | 5.61 | 2.06 | 31.0 |
| 3. | Calcined. 1650° C. for 4 h. milling for 36 h, classified | 4.62 | 5.51 | 3.94 | 19.5 |
| 4. | Calcined. 1800° C. for 15 mins. milling for 36 h | 3.36 | 11.54 | 6.34 | 25.0 |

*Data represents average of 5 different powder lots

The binder-free turbocharger sized part was then prefired to a temperature up to 1400° C., cooled to room temperature, and cold isostatically pressed, isopressed, in a flexible rubber bag from pressures of 5,000 psi up to 50,000 psi. However, the pressures greater than 50,000 psi can be used. To prevent sticking of the rubber bag to the part a boron nitride lubricating layer can be used. The alternative process is to isopress the binder-free part (which is generally fragile and requires careful handling) without prefiring. However, prefiring is recommended for a complex part because it provides the strength necessary for handling and isopressing. Instead of using rubber bags which may be cumbersome for a complex cross section part (e.g. automotive gas turbine rotor), thin elastomer conformal coatings (e.g. commercially available plastisol, PVA, acrylics, or waxes) having a thickness equal to or greater than 0.20 mm could be used. The thin coatings can be applied by various methods such as dipping, spraying, brushing, etc. After the coated part is isostatically pressed and removed from the press, the thin coating is removed prior to the sintering step. The thin coating has been removed successfully by a burn off cycle (to 550° C.) as well as removal by peeling. The isopressed part can then be sintered in a conventional manner to provide 99% of theoretical density. Table III gives some examples of crack-free turbocharger sized samples fabricated via this process routing. Cracks, internal as well as external, could not be eliminated without the use of an appropriate starting material, a proper setter and an isopressing operation.

TABLE III

Examples of injection molded and sintered turbocharger (cross section up to 1.9 cm) sized test samples.

| Specimen No.* | Prefiring Temp and Time | Isopress | Part Density (psi) | Comments |
|---|---|---|---|---|
| 46 | — | 5000 | 99.22 | Visually 10× crack-free. |
| 48 | — | 10,000 | 99.21 | Visually 10× crack-free. |
| 51 | — | 20,000 | 99.50 | Visually 10× crack-free. |
| 52 | 1400° C.-4 h | 25,000 | 99.00 | Visually 10× crack-free. |
| 45 | 1000° C.-4 h | 18,000 | 99.30 | Visually 10× crack-free. |

*Starting powder for all these specimens was powder no. 4 of Table II. For binder removal, a calcined silicon nitride setter powder and a 10° C./h heating in $N_2$ to 450° C. followed by 20 hour hold at 600° C. in air was used.

In the process routing, as shown in Table I, four areas are considered critical for fabrication of large, complex shapes: starting powder, binder removal setter powder, prefiring, and isopressing. The concepts that are used in the present invention are believed to be new and novel. The concept of isopressing a molded part which has binder removed (burnout) (with or without prefiring) can be used to improve the reliability of all ceramics of any shape and size and prepared by methods other than injection molding (e.g. slip casting).

While there has been shown and described what is at present considered the preferred embodiment of the invention, it will be obvious to those skilled in the art that various changes and modifications may be made therein without departing from the scope of the invention as defined by the appended claims.

What is claimed is:

1. A method for fabricating a large cross-sectional ceramic article by injection molding comprising the following steps:

Step 1. compounding a ceramic powder with about 34 to about 42 v/o of a binder to form a blend, said ceramic powder having a mean particle size from about 2 to about 12 microns;

Step 2. injection molding the product from step 1 to form a molded ceramic article having a cross-section greater than about one centimeter;

Step 3. embedding the product from step 2 in a setter bed containing a setter powder to form a binder retarding layer of said setter powder on said molded ceramic article;

Step 4. heating the product of step 3 in a non-oxidizing environment at a heating rate equal to or greater than 1° C. per hour;

Step 5. retarding the removal of said binder from said molded ceramic article sufficiently to maintain equal to or greater than 80 w/o of said binder within said molded ceramic article until a temperature of 400° C. is obtained;

Step 6. increasing the temperature from step 5 to 450° C. at a heating rate equal to or greater than 1° C. per hour in a non-oxidizing environment to allow breakdown of the binder retarding layer and to allow binder vaporization;

Step 7. increasing the temperature from step 6 to about 600° C. and maintaining the product at 600° C. in air for a period sufficient to completely remove said binder from said molded ceramic article;

Step 8. cooling the product from step 7 to room temperature to obtain an externally crack-free injection molded and binder free ceramic article having a cross section greater than one centimeter;

Step 9. isopressing the product from step 8 at a pressure equal to or greater than 5,000 psi; and Step 10. sintering the product from step 9 at a temperature sufficient to obtain a density greater than 98% of theoretical density.

2. A method for fabricating a large cross-sectional ceramic article by injection molding comprising the following steps:

Step 1. compounding a ceramic powder with about 34 to about 42 v/o of a binder to form a blend, said ceramic powder having a mean particle size from about 2 to about 12 microns;

Step 2. injection molding the product from step 1 to form a molded ceramic article having a cross-section greater than about one centimeter;

Step 3. embedding the product from step 2 in a setter bed containing a setter powder to form a binder retarding layer of said setter powder on said molded ceramic article;

Step 4. heating the product of step 3 in a non-oxidizing environment at a heating rate equal to or greater than 1° C. per hour;

Step 5. retarding the removal of said binder from said molded ceramic article sufficiently to maintain equal to or greater than 80 w/o of said binder within said molded ceramic article until a temperature of 400° C. is obtained;

Step 6. increasing the temperature from step 5 to 450° C. at a heating rate equal to or greater than 1° C. per hour in a non-oxidizing environment to allow breakdown of the binder retarding layer and to allow binder vaporization;

Step 7. increasing the temperature from step 6 to about 600° C. and maintaining the product at 600° C. in air for a period sufficient to completely remove said binder from said molded ceramic articles;

Step 8. cooling the product from step 7 to room temperature to obtain an externally crack-free injection molded and binder free ceramic article having a cross section greater than one centimeter;

Step 9. heating the product of step 8 to a temperature less than or equal to about 1500° C. in a nitrogen atmosphere;

Step 10. isopressing the product from step 9 at a pressure equal to or greater than 5,000 psi; and Step 11. sintering the product from step 10 at a temperature sufficient to obtain a density greater than 98% of theoretical density.

3. A method in accordance with claim 1 wherein said ceramic powder comprises a silicon nitride powder containing sintering aids.

4. A method in accordance with claim 3 wherein said sintering aids are selected from the group consisting of $Y_2O_3$, $Al_2O_3$, MgO and combinations thereof.

5. A method in accordance with claim 1 wherein said binder comprises about 37 v/o to about 40 v/o of said blend.

6. A method in accordance with claim 1 wherein said mean particle size of said ceramic powder comprises from about 5 to about 10 microns.

7. A method in accordance with claim 1 wherein said cross section of said molded ceramic article is greater than one centimeter up to 1.9 centimeter.

8. A method in accordance with claim 1 wherein said setter powder comprises a silicon nitride powder containing 6 w/o $Y_2O_3$ and 2 w/o $Al_2O_3$ and having a BET of 0.2 $m^2$/g.

9. A method in accordance with claim 1 wherein said period sufficient to completely remove said binder from within said molded ceramic article in step 5 is from about 3 to about 17 days.

10. A method of fabricating an externally crack free injection molded ceramic part having a large cross-section comprising the following steps:

Step 1. calcining a ceramic powder having a mean particle size less than one micron, said calcining being sufficient to increase said mean particle size to greater than 2 microns;

Step 2. comminuting the product from step 1 sufficiently to obtain a ceramic powder having a size from about 2 to about 12 microns;

Step 3. compounding the product from step 2 with about 34 to about 42 v/o of a binder to form a blend, said ceramic powder having a mean particle size from about 2 to about 12 microns;

Step 4. injection molding the product from step 3 to form a molded ceramic article having a cross-section greater than about one centimeter;

Step 5. embedding the product from step 4 in a setter bed containing a setter powder to form a binder retarding layer of said setter powder on said molded ceramic article;

Step 6. heating the product of step 5 in a non-oxidizing environment at a heating rate equal to or greater than 10° C. per hour;

Step 7. retarding the removal of said binder from said molded ceramic article sufficiently to maintain equal to or greater than 80 w/o of said binder within said molded ceramic article until a temperature of 400° C. is obtained;

Step 8. increasing the temperature from step 7 to 450° C. at a heating rate equal to or greater than 1° C. per hour in a non-oxidizing environment to allow breakdown of the binder retarding layer and to allow binder vaporization;

Step 9. increasing temperature from step 8 to about 600° C. and maintaining the product at 600° C. in air for a period sufficient to completely remove said binder from said molded ceramic article;

Step 10. cooling the product from step 9 to room temperature to obtain an externally crack-free injection molded and binder free ceramic article having a cross section greater than one centimeter;

Step 11. heating the product of step 10 to a temperature less than or equal to about 1500° C. in a nitrogen atmosphere;

Step 12. isopressing the product from step 11 at a pressure equal to or greater than 5,000 psi; and Step 13. sintering the product from step 12 at a temperature sufficient to obtain a density greater than 98% of theoretical density.

11. A method in accordance with claim 10 wherein said ceramic powder comprises a silicon nitride powder containing sintering aids.

12. A method in accordance with claim 11 wherein said sintering aids are selected from the group consisting of $Y_2O_3$, $Al_2O_3$, MgO and combinations thereof.

13. A method in accordance with claim 10 wherein said binder comprises about 37 v/o to about 40 v/o of said blend.

14. A method in accordance with claim 10 wherein said mean particle size of said ceramic powder comprises from about 5 to about 10 microns.

15. A method in accordance with claim 10 wherein said setter powder comprises a silicon nitride powder containing 6 w/o $Y_2O_3$ and 2 w/o $Al_2O_3$ and having a BET of 0.2 $m^2$/g.

16. A method in accordance with claim 10 wherein said period sufficient to completely remove said binder from within said molded ceramic article in step 5 is from about 3 to about 17 days.

17. A method in accordance with claim 10 wherein said isopressing the product from step 10 at a pressure equal to or greater than 5,000 psi comprises coating the product from step 10 after cooling to room temperature with a thin elastomer conformal coating, cold isostatic pressing at a pressure equal to or greater than 5,000 psi and maintaining that pressure for about 30 seconds, removing the cold isostatic pressed product from the press, and removing the thin elastomer conformal coating from the product.

18. A method in accordance with claim 17 wherein said thin elastomer conformal coating is equal to or greater than 0.2 mm thick.

19. A method in accordance with claim 1 wherein said binder comprises 90 w/o paraffin wax, 5 w/o surfactant, and 5 w/o epoxy thermosetting material.

20. A method in accordance with claim 2 wherein said binder comprises 90 w/o paraffin wax, 5 w/o surfactant, and 5 w/o epoxy thermosetting material.

21. A method in accordance with claim 10 wherein said binder comprises 90 w/o paraffin wax, 5 w/o surfactant, and 5 w/o epoxy thermosetting material.

22. A method of fabricating a large cross-sectional ceramic article by injection molding comprising the following steps:
Step 1—reducing the amount of ceramic particles having a size equal to or less than one micron in a ceramic powder;
Step 2—compounding said ceramic powder from step 1 with about 34 to about 42 v/o of a binder to form a blend;
Step 3—injection molding the product from step 2 to form a molded ceramic article having a cross-section greater than about one centimeter;
Step 4—embedding the product from step 3 in a setter bed containing a setter powder to form a binder retarding layer of said setter powder on said molded ceramic article;
Step 5—heating the product of step 4 in a non-oxidizing environment at a heating rate equal to or greater than 1° C. per hour;
Step 6—retarding the removal of said binder from said molded ceramic article sufficiently to maintain equal to or greater than 80 w/o of said binder within said molded ceramic article until a temperature of 400° C. is obtained;
Step 7—increasing the temperature from step 6 to 450° C. at a heating rate equal to or greater than 1° C. per hour in a non-oxidizing environment to allow breakdown of the binder retarding layer and allow binder vaporization;
Step 8—increasing the temperature from step 7 to about 600° C. and maintaining the product at 600° C. in air for a period sufficient to completely remove said binder from said molded ceramic article;
Step 9—cooling the product from step 8 to room temperature to obtain an externally crack-free injection molded and binder free ceramic article having a cross section greater than one centimeter;
Step 10—heating the produce of step 9 to a temperature less than or equal to about 1500° C. in a nitrogen atmosphere;
Step 11—isopressing the product from step 10 at a pressure equal to or greater than 5,000 psi; and
Step 12—sintering the product from step 11 at a temperature sufficient to obtain a density greater than 98% of theoretical density.

23. A method in accordance with claim 22 wherein said reducing of step 1 comprises calcining a ceramic powder having particles equal to or less than one micron at a temperature and for a period sufficient to reduce the amount of said particles forming a ceramic powder having a reduced amount of particles equal to or less than one micron; and comminuting said ceramic powder having a reduced amount of partices equal to or less than one micron for a period sufficient to obtain a ceramic powder having a mean particle size from about 2 to about 12 microns.

24. A method in accordance with claim 22 wherein said ceramic powder comprises a silicon nitride powder containing sintering aids.

25. A method in accordance with claim 23 wherein said sintering aids are selected from the group consisting of $Y_2O_3$, $Al_2O_3$, $MgO$ and combinations thereof.

26. A method in accordance with claim 19 wherein said binder is about 37 v/o to about 40 v/o of said blend.

27. A method in accordance with claim 22 wherein said mean particle size of said ceramic powder comprises from about 5 to about 10 microns.

28. A method in accordance with claim 22 wherein said setter powder comprises a silicon nitride powder containing 6 w/o $Y_2O_3$ and 2 w/o $Al_2O_3$ and having a BET of $0.2 m^2/g$.

29. A method in accordance with claim 22 wherein said period sufficient to completely remove said binder from within said molded ceramic article in step 6 is from about 3 to about 17 days.

30. A method in accordance with claim 22 wherein said binder comprises 90 w/o paraffin wax, 5 w/o surfactant, and 5 w/o epoxy thermosetting material.

* * * * *